UNITED STATES PATENT OFFICE.

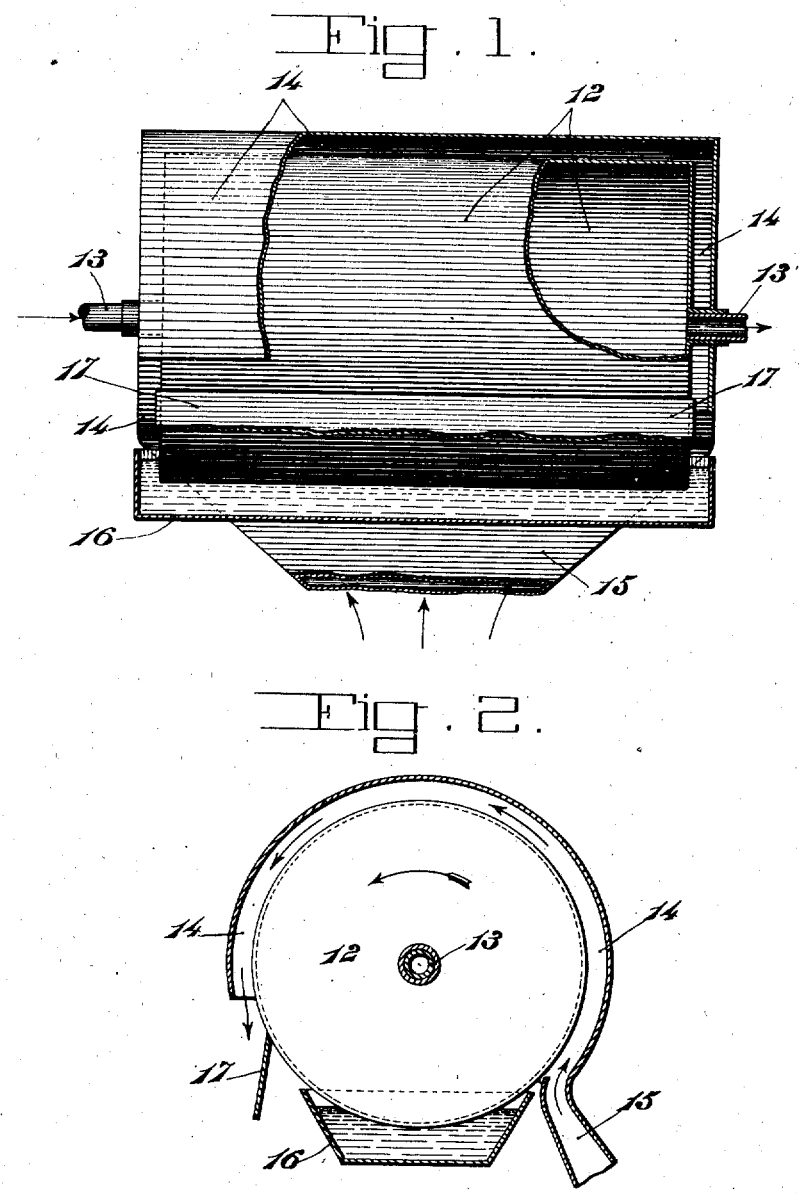

ANDREW A. DUNHAM, OF BAINBRIDGE, NEW YORK, ASSIGNOR TO CASEIN COMPANY OF AMERICA, A CORPORATION OF NEW JERSEY.

PROCESS FOR PRODUCING DESICCATED MILK.

1,074,419.  Specification of Letters Patent.  Patented Sept. 30, 1913.

Application filed April 11, 1913. Serial No. 760,403.

*To all whom it may concern:*

Be it known that I, ANDREW A. DUNHAM, a citizen of the United States, residing at Bainbridge, in the county of Chenango and State of New York, have invented or discovered certain new and useful Improvements in Processes for Producing Desiccated Milk, of which the following is a specification, reference being had therein to the accompanying drawing.

This invention relates to a novel process for the production of desiccated milk or milk powder which will quickly dissolve in cold water and provide a synthetic milk which will have all the properties of normal fresh milk, avoiding all sediment or cooked milk taste.

In order to produce a cold soluble milk powder it has heretofore been deemed necessary that the desiccating process should be carried on entirely at temperatures below the point at which the albumin in the milk is liable to coagulate, or below a temperature of 158° F.; but the final evaporation or drying of the milk at such low temperatures is necessarily objectionably slow, and the present invention has for its object to avoid this objection while resulting in a product having all the characteristics of the cold water soluble milk powders heretofore produced.

In carrying the present invention into effect the milk either whole or skimmed, is first evaporated in an ordinary vacuum pan or by other means where high temperatures can be avoided, to a consistency of a heavy cream or approximately to about 15° Beaumé, this process being carried on at a temperature below the coagulating point of albumin. After having been thus evaporated or condensed in a vacuum pan, or otherwise, the condensed or thickened product is finally desiccated on a rotating drum or cylinder which is heated internally, preferably by hot water, to a temperature of about 165° F., or say from 160° to 170° F., which is above the coagulating point of albumin. This rotating drum or cylinder on which a thin film of the condensed milk is subjected to the final drying process, is partially surrounded by a curved hood forming, adjacent to said cylinder, an air passage through which an air blast preferably heated to a temperature of about 185° to 190° F. is forced, so that the film of milk will be quickly dried. Although the condensed milk is thus finally dried or desiccated by subjecting the same to a temperature above the coagulating point of albumin I have discovered that by first condensing the milk, as above stated, at a temperature below the coagulating point of albumin, the final drying of the milk at higher temperatures does not result in such coagulation of the albumin as will render the product insoluble in cold water, in that the calcium salts contained in the condensed milk do not coact at high temperatures with the casein present in the milk to such an extent as when the milk is not condensed; with the result that the finally desiccated milk or milk powder is completely and readily soluble in cold water.

In the accompanying drawing, in which is illustrated an apparatus by which the final desiccation of the milk may be effected, Figure 1 is a sectional elevation and Fig. 2 a side view.

Referring to the drawing, 12 denotes a rotating cylinder having hollow journals 13 connected with suitable supply and discharge pipes so that a circulation of warm water through the cylinder may be effected. The cylinder 12 is partially surrounded by a curved head 14 through which a blast of hot air may be caused to pass, said hood being connected to a suitable conduit 15 communicating with any proper hot air supply. The condensed milk which has been evaporated, as hereinbefore stated, at a temperature below the coagulating poin of the albumin, is received in a vat or pan 16 into which the lower part of the cylinder 12 dips so that as the said cylinder rotates in the direction of the arrow in Fig. 2 a film of the condensed milk will be carried up and around and will be reduced to dryness by the time it arrives at the scraper or doctor 17 by which it will be removed from the cylinder in the usual manner.

While it is preferred that in the first evaporating process the milk should be condensed to a consistency represented by about 15° Beaumé, this consistency may be varied somewhat. Also the temperature of the rotating cylinder and air blast, to which the condensed milk is subjected in the final evaporating or drying process, may be varied somewhat from those hereinbefore stated, without departing from the essence of the invention.

Having thus described my invention or discovery I claim and desire to secure by Letters Patent:

1. The herein described process for producing desiccated milk, consisting in first partially evaporating or condensing milk at a temperature or temperatures below the coagulating point of albumin, and finally drying the milk on a rotating cylinder internally heated to a temperature above the coagulating point of albumin, and simultaneously subjecting the film of milk to be dried to a hot air blast.

2. The herein described process for producing desiccated milk, consisting in first partially evaporating or condensing milk at a temperature or temperatures below the coagulating point of albumin, and finally drying the milk on a moving surface heated to a temperature above the coagulating point of albumin, and simultaneously subjecting the film of milk to be dried to a hot air blast.

In testimony whereof I affix my signature, in presence of two witnesses.

ANDREW A. DUNHAM.

Witnesses:
L. A. STEVENS,
O. L. CRUMB.

---

Corrections in Letters Patent No. 1,074,419.

It is hereby certified that in Letters Patent No. 1,074,419, granted September 30, 1913, upon the application of Andrew A. Dunham, of Bainbridge, New York, for an improvement in "Processes for Producing Desiccated Milk," errors appear in the printed specification requiring correction as follows: Page 1, line 84, for the word "head" read *hood;* same page, line 90, for the word "poin" read *point;* and that the said Letters Patent should be read with these corrections therein that the same may conform to the record of the case in the Patent Office.

Signed and sealed this 25th day of July, A. D., 1916.

[SEAL.]

F. W. H. CLAY,
*Acting Commissioner of Patents.*

Cl. 99—5.

Having thus described my invention or discovery I claim and desire to secure by Letters Patent:

1. The herein described process for producing desiccated milk, consisting in first partially evaporating or condensing milk at a temperature or temperatures below the coagulating point of albumin, and finally drying the milk on a rotating cylinder internally heated to a temperature above the coagulating point of albumin, and simultaneously subjecting the film of milk to be dried to a hot air blast.

2. The herein described process for producing desiccated milk, consisting in first partially evaporating or condensing milk at a temperature or temperatures below the coagulating point of albumin, and finally drying the milk on a moving surface heated to a temperature above the coagulating point of albumin, and simultaneously subjecting the film of milk to be dried to a hot air blast.

In testimony whereof I affix my signature, in presence of two witnesses.

ANDREW A. DUNHAM.

Witnesses:
L. A. STEVENS,
O. L. CRUMB.

---

Corrections in Letters Patent No. 1,074,419.

It is hereby certified that in Letters Patent No. 1,074,419, granted September 30, 1913, upon the application of Andrew A. Dunham, of Bainbridge, New York, for an improvement in "Processes for Producing Desiccated Milk," errors appear in the printed specification requiring correction as follows: Page 1, line 84, for the word "head" read *hood;* same page, line 90, for the word "poin" read *point;* and that the said Letters Patent should be read with these corrections therein that the same may conform to the record of the case in the Patent Office.

Signed and sealed this 25th day of July, A. D., 1916.

[SEAL.]

F. W. H. CLAY,

*Acting Commissioner of Patents.*

Cl. 99—5.

Corrections in Letters Patent No. 1,074,419.

It is hereby certified that in Letters Patent No. 1,074,419, granted September 30, 1913, upon the application of Andrew A. Dunham, of Bainbridge, New York, for an improvement in "Processes for Producing Desiccated Milk," errors appear in the printed specification requiring correction as follows: Page 1, line 84, for the word "head" read *hood;* same page, line 90, for the word "poin" read *point;* and that the said Letters Patent should be read with these corrections therein that the same may conform to the record of the case in the Patent Office.

Signed and sealed this 25th day of July, A. D., 1916.

[SEAL.]

F. W. H. CLAY,

*Acting Commissioner of Patents.*

Cl. 99—5.